Figure 1:
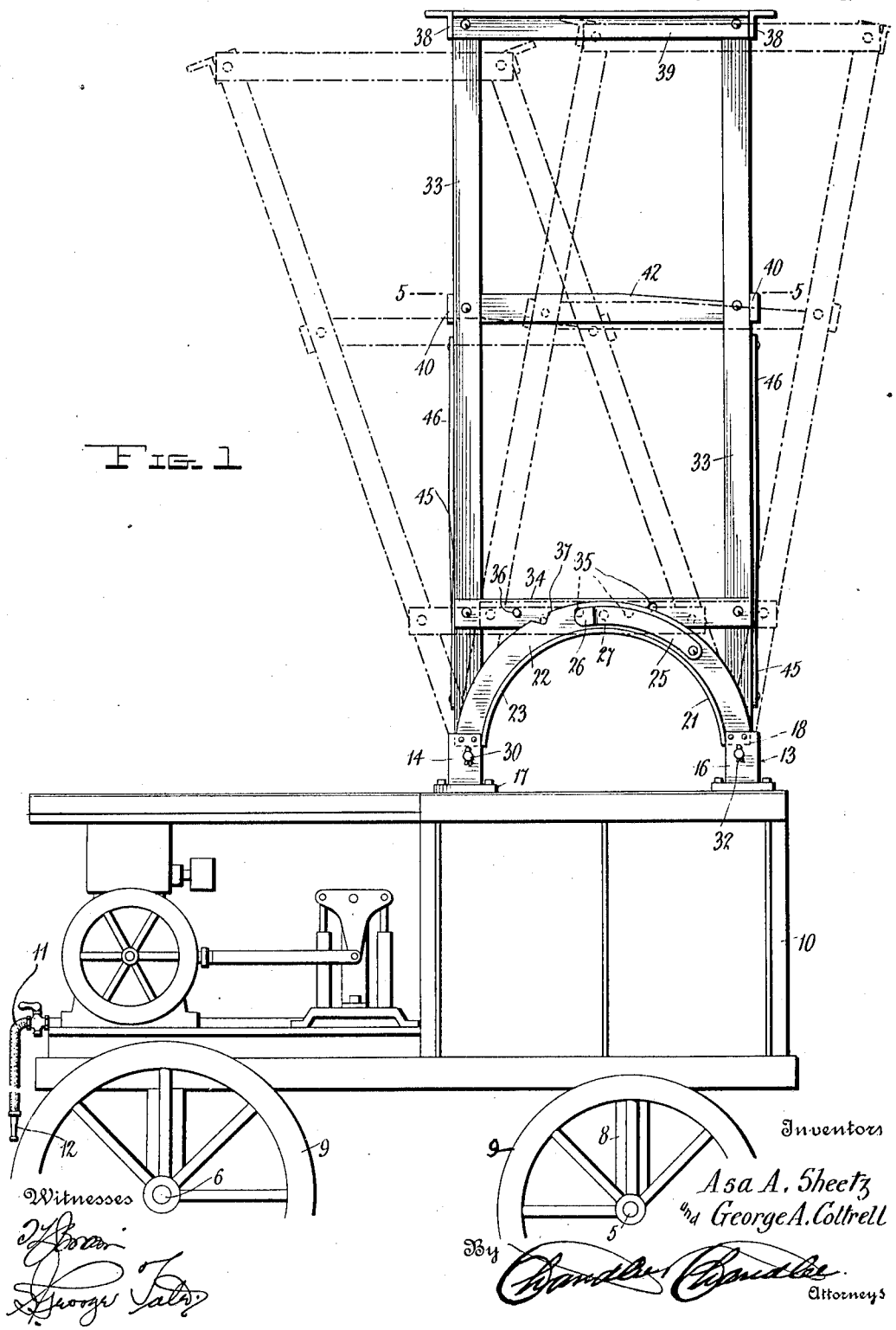

A. A. SHEETZ & G. A. COTTRELL.
PORTABLE SPRAYING TOWER.
APPLICATION FILED FEB. 27, 1911.

1,020,061.   Patented Mar. 12, 1912.
3 SHEETS—SHEET 1.

Witnesses

Inventors
Asa A. Sheetz
and George A. Cottrell
By
Attorneys

A. A. SHEETZ & G. A. COTTRELL.
PORTABLE SPRAYING TOWER.
APPLICATION FILED FEB. 27, 1911.
1,020,061.
Patented Mar. 12, 1912.
3 SHEETS—SHEET 2.
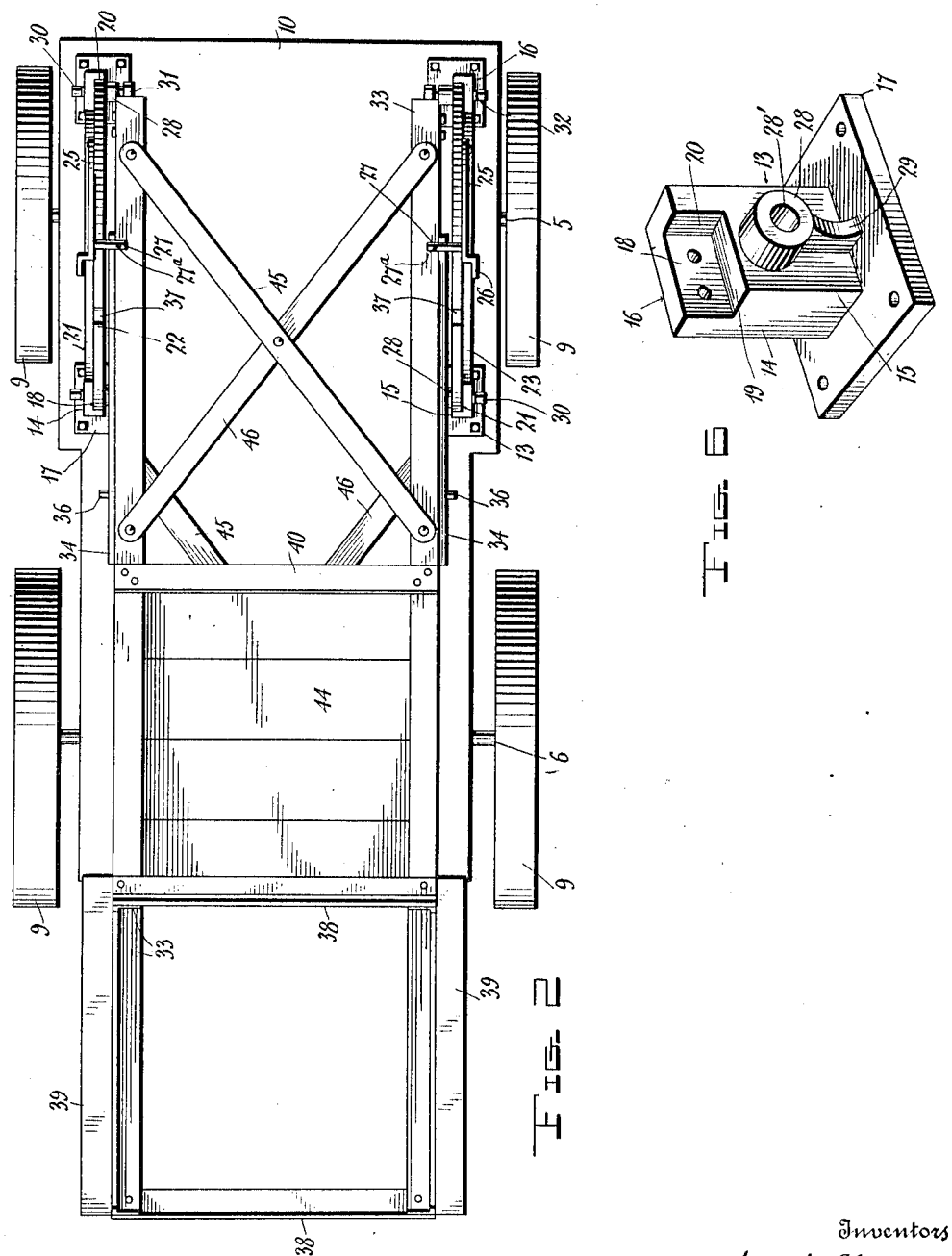

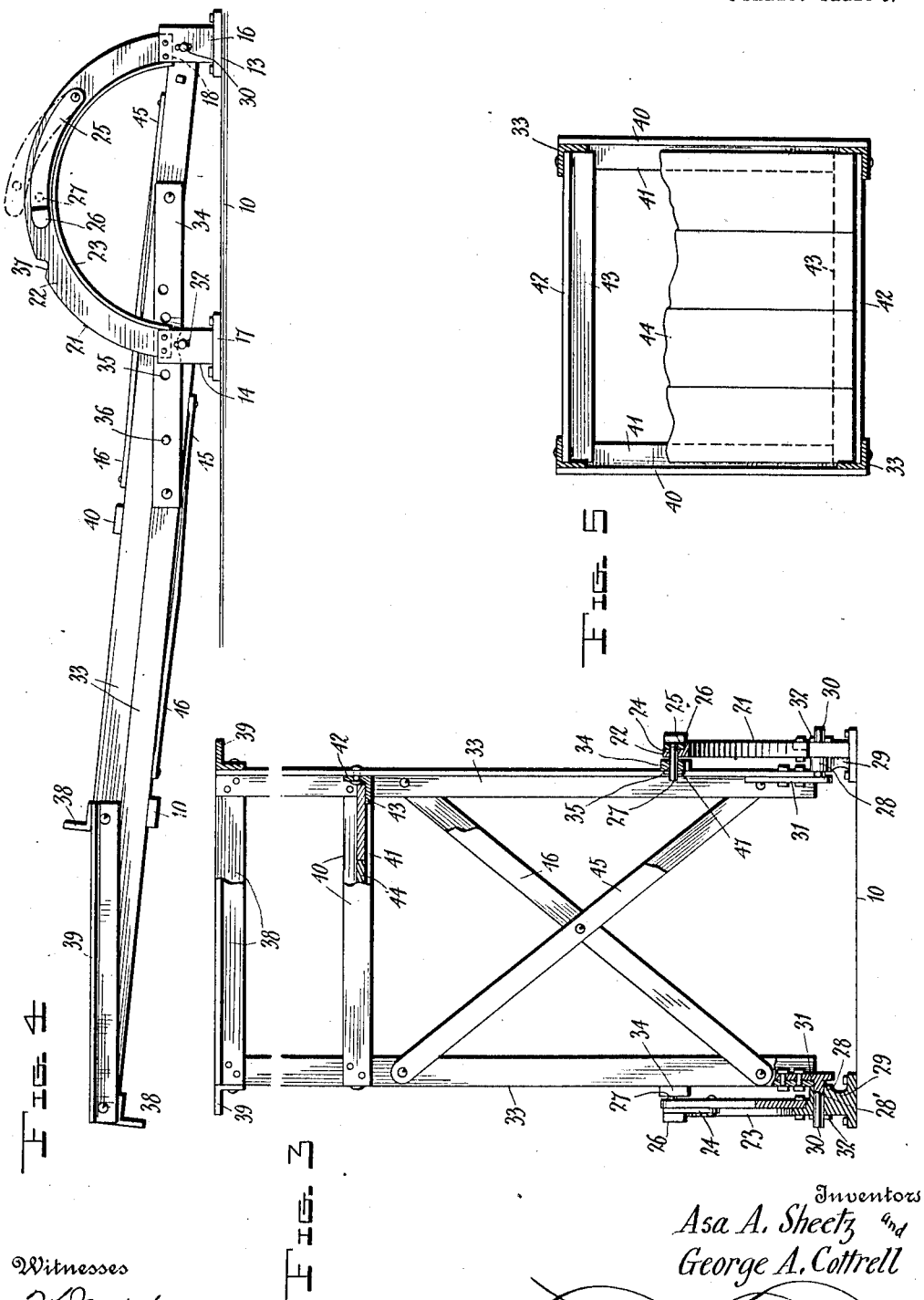

UNITED STATES PATENT OFFICE.

ASA A. SHEETZ, OF WOODSTOCK, VIRGINIA, AND GEORGE A. COTTRELL, OF MILFORD, MICHIGAN.

PORTABLE SPRAYING-TOWER.

1,020,061.  Specification of Letters Patent. Patented Mar. 12, 1912.

Application filed February 27, 1911. Serial No. 611,225.

*To all whom it may concern:*

Be it known that we, ASA A. SHEETZ and GEORGE A. COTTRELL, citizens of the United States, residing, respectively, at Woodstock, in the county of Shenandoah and State of Virginia, and Milford, in the county of Oakland and State of Michigan, have invented certain new and useful Improvements in Portable Spraying-Towers; and we do hereby declare the following to be a full, clear, and exact description of the invention, such as will enable others skilled in the art to which it appertains to make and use the same.

This invention relates to an improvement in portable sprayers of that type particularly adapted for the spraying of trees.

In sprayers now in general use a tank is supported upon a suitable running gear, and extending from the tank is the usual hose and spraying nozzle. It has been found to be impracticable for an operator to stand on the ground and thoroughly spray the tops of trees with sprayers of this type, particular reference being had to tall trees.

The principal object of this invention is to provide a sprayer tank with a tower upon which the operator may stand and thereby be in a position to thoroughly spray the tops of trees.

Another object of the invention is to provide a tower for the purpose described which is pivotally connected to the tank, whereby said tower may be folded down upon the tank when transporting the apparatus over a field or when housing the same.

Another object of the invention is to provide a tower of the character described which when set up for use is securely locked against movement in any direction.

A further object of the invention is to provide a tower with a novel platform construction for the operator.

A still further object of the invention is to provide a tower for the purpose described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a side elevation of a wheeled spraying tank, showing our invention associated therewith, Fig. 2 is a top plan view thereof, but showing the tower folded upon the tank, Fig. 3 is an end elevation of the structure shown in Fig. 1, Fig. 4 is a side elevation of the structure shown in Fig. 2, Fig. 5 is a detail sectional view taken on the line 5—5 of Fig. 1, and Fig. 6 is a detail perspective view of one of the brackets.

Like reference numerals designate corresponding parts in all the figures of the drawings.

Referring to the drawings, 5 designates the front axle, 6 the rear axle of a suitable vehicle running gear indicated as a whole by the reference numeral 8. Mounted upon these axles are the usual ground wheels 9. Suitably supported by the running gear is a tank 10 of any suitable construction and adapted to contain a spraying mixture. Leading from this tank is a flexible hose 11 having a spraying nozzle 12 attached to its free end, the hose including in its line a suitable force-pump.

Disposed upon the top of the tank 10 is a plurality of spaced pairs of bracket bearings, which are each indicated as a whole by the numeral 13. Inasmuch as the construction of the bracket bearings is alike, the description of one is deemed to be sufficient. Each bracket bearing is formed of any suitable metal, and comprises a substantially rectangular body portion 14, which normally extends vertically, and has its flat inner and outer faces 15 and 16 disposed longitudinally of the tank. Extending laterally from the lower end of the body portion is a plate 17, the curve of the plate conforming to the surface of the tank. This plate is provided with a plurality of openings through which screws, rivets, or other suitable fastening means are passed for engagement with the tank to secure said brackets in position. The inner face of the body portion is formed with an angular recess 18 forming a consequent bottom wall 9 and a vertical shoulder 20, the recesses of each pair of brackets extending toward each other.

The invention further comprises a pair of spaced longitudinally disposed arcuate locking plates 21 of angle iron construction. Each plate consists of a vertical wall 22 and a laterally projecting flange 23. The ends of each plate are respectively secured to the contiguous brackets, the wall 22 being disposed within the recesses 18 and the flange 23 against the body portion 14. The extreme ends of the plates rest upon the bottom 19 formed by the recess 18, and the outer edge of the wall 22 bears against the shoulder 20. These ends are rigidly connected to the brackets by means of bolts, rivets, or other suitable fastening means. The vertical wall 22 of each plate is centrally provided with an opening 24. A flat arcuate latch 25 is normally disposed against the outer face of each vertical wall, and has one end fixedly secured to each wall by a rivet or other suitable fastening means. This latch is formed of resilient metal, and has its free end beyond the opening 24 outwardly and thence forwardly bent to form a finger-piece 26. Laterally projecting from the latch 25 and rigidly secured thereto, is a tapered pin 27 adapted to be normally retained within the opening 24 by means of the spring latch 25.

Formed in the body portion 14 of each bracket below the recess 18 is a transverse opening, and extending inwardly from the body portion and registering with the said opening is an integral extension bearing 28. Integrally formed with the bearing 28 and with the base flange 17, is a fillet 29 which serves to securely support the said extension 28. An axle 30 is disposed within each of said openings and extension bearings 28, and has its inner end formed with a right angular extension 31 which normally bears against the outer end of the extension bearing 28. The end of the axle 30 opposite the extension 31 passes through the body portion of the bracket bearing, and is provided with a transverse opening through which a cotter-pin 32 or other suitable fastening means is disposed. By this arrangement it will be observed that the extension 31 is disposed in spaced relation to the body portion 14.

The extension further comprises a tower, which consists of vertical frame members 33, preferably of angle iron construction. These members are disposed in spaced relation, and are respectively secured to one of the extensions 31 of the axles 30 by means of bolts or other suitable fastening means. Each pair of these members adjacent the bracket bearings are pivotally connected by means of longitudinal members 34. These members 34 are normally disposed against the vertical wall 22 of the arcuate locking plate, and are each provided with a plurality of openings 35 adapted to receive the locking pin 27, and thereby securely lock the frame members against movement in either direction. Extending outwardly from the longitudinal members 34 and in rear of the arcuate plate, is a pin 36. This pin when the tower frame is in a normally vertical position, is disposed in spaced relation to said arcuate plate. When, however, the locking pins are disengaged from the frame, the tower can be swung rearwardly until the pins 36 engage in recesses 37 formed in the vertical wall 22 of said arcuate plate, and thereby limit the forward movement of said tower frame. The upper ends of the frame members 33 are rigidly connected by means of transversely disposed angle iron braces 38. The members 33 are pivotally connected by longitudinal members 39 of angle iron construction. The members 38 and 39 not only form braces for the frame members 33, but also form a guard rail for a purpose hereinafter described. Disposed below the said guard rail and connecting the opposite members 23 are transverse braces 40—40 of angle iron construction. The braces 40 include inwardly extending bottom flanges 41—41. Oppositely disposed to these braces and pivotally connecting the opposite pair of members 33 are longitudinal members 42—42 of angle iron construction. These members are also provided with inwardly extending flanges 43—43 which are normally disposed in a plane with the flanges 41 of the before mentioned braces. These inwardly extending flanges coact to form a seat for a platform 44 upon which the operator may stand. Thus it will be observed that when the operator is working from this platform above mentioned guard rails eliminate all danger of the operator falling therefrom. The frame members 33 are furthermore connected by means of cross-braces 45 and 46 respectively.

From the foregoing, it will be observed that when the tower is disposed in a position indicated in Figs. 1 and 3 of the drawings, the same in held against movement by means of the locking pins 27. These pins are provided with vertical openings 27ª at their free ends, and in order to positively secure these pins against displacement cotter-pins 47 are disposed within said openings. The operator can stand upon the platform of the tower, and by means of the hose before mentioned can quickly and easily spray the tops of trees.

It may be desired at certain times to swing the tower either forwardly or rearwardly for a short distance. This may be accomplished by withdrawing the locking pins, swinging the tower in the direction desired, and then positioning said locking pins in the proper openings 35. The cotter pins 47 may be employed to withhold the locking pins from engagement while the frame is being swung.

When it is desired to transport the apparatus the frame can be swung rearwardly upon the tank as clearly shown in Figs. 2 and 4 of the drawings. When the tower is thus disposed the apparatus can be moved around over a field or through an orchard without any danger of the tower contacting with any trees. This position of the tower will also permit of the apparatus being easily stored in any suitable housing, such for instance, as a barn or the like.

What is claimed is:

1. A spraying tower comprising attaching brackets, uprights pivotally connected with the corresponding brackets, arcuate plates connecting the brackets in pairs, a latch member carried by each arcuate plate, cross bars carried by the uprights and each adapted at intervals for coöperation with the latch member to hold the uprights at different points of their pivotal movements, and means carried by the uprights for sustaining an operator.

2. A spraying tower comprising attaching brackets, tower frame members journaled in the brackets, longitudinal members pivotally connected to the frame members and respectively provided with a plurality of openings, locking plates secured to the brackets and disposed adjacent said longitudinal members, and locking means carried by the plates for engagement with one of the openings of the longitudinal members for holding the frame in an adjusted position.

3. A spraying tower comprising attaching brackets, tower frame members journaled in said brackets, longitudinal members pivotally connected to the frame members and provided with a plurality of openings, arcuate plates disposed on either side of the tower and having their ends secured to the brackets, said plates being centrally provided with an opening adapted to register with one of the openings of the longitudinal members in one position of the tower, and a spring latch secured to each plate and provided with a pin adapted to project through the registering openings of the plate and member for holding said tower against movement.

4. In combination with a wheeled supported sprayer tank, of bearing brackets secured to the tank, a tower including frame members journaled in the bearing brackets, longitudinal members pivotally connected to the frame members and respectively provided with a plurality of openings, locking plates secured to the brackets and disposed adjacent said longitudinal members, and locking means carried by the plates for engagement with one of the openings of the longitudinal members for holding the frame in an adjusted position.

5. In combination with a wheeled supported sprayer tank, of bearing brackets secured to the tank, a tower including frame members journaled in said brackets, longitudinal members pivotally connected to the frame members and provided with a plurality of openings, arcuate plates disposed on either side of the tower and having their ends secured to the brackets, said plates being centrally provided with an opening adapted to register with one of the openings of the longitudinal members in one position of the tower, and a spring latch secured to each plate and provided with a pin adapted to project through the registering openings of the plate and member for holding said tower against movement.

In testimony whereof, we affix our signatures in presence of two witnesses.

ASA A. SHEETZ.
GEORGE A. COTTRELL.

Witnesses:
Geo. H. Chandlee,
Jos. H. Blackwood.

---

Copies of this patent may be obtained for five cents each, by addressing the "Commissioner of Patents, Washington, D. C."